United States Patent [19]

Schenk et al.

[11] 3,725,796

[45] Apr. 3, 1973

[54] PROCESS FOR THE MEASUREMENT OF THE DISTORTION IN TRANSMISSION SYSTEMS WHICH TRANSMIT DATA IN PARALLEL BIT CODED FORM

[75] Inventors: Erwin Schenk; Kurt Biedermann, both of Munich, Germany

[73] Assignee: Siemens Aktiengesellschaft, Berlin and Munich, Germany

[22] Filed: June 9, 1971

[21] Appl. No.: 151,428

[30] Foreign Application Priority Data

June 10, 1970 Germany....................P 20 28 655.9

[52] U.S. Cl.................................328/163, 178/69 A

[51] Int. Cl.............................H03b 1/00, H03k 5/00

[58] Field of Search..............328/162, 163; 178/69 A

[56] References Cited

UNITED STATES PATENTS

| | | | |
|---|---|---|---|
| 2,856,457 | 10/1958 | Prior et al. | 178/69 A |
| 3,182,127 | 5/1965 | Wiese | 178/69 A |
| 3,189,733 | 6/1965 | Cannon et al. | 178/69 A X |
| 3,436,478 | 4/1969 | Ehrat | 178/69 A |
| 3,581,009 | 5/1971 | Schenk | 178/69 A |

*Primary Examiner*—Stanley D. Miller, Jr.
*Attorney*—Birch, Swindler, McKie and Beckett

[57] ABSTRACT

A process for the measurement of distortion in systems which employ parallel transmission of binary data is described. A first impulse edge appearing on one of the parallel output lines fixes a reference point and actuates a first timing member. The first timing member subsequently emits an impulse after an interval corresponding to 1.5 times the theoretical character duration has elapsed. The output of the first timing member is used as a scanning mark. All of the impulse edges arising on the output lines during the aforementioned delay interval are routed to an indicating device producing an indication of their time positions relative to the reference point. The first impulse on the output lines actuates a second timing member which produces an output upon the appearance of the first impulse occurring after the aforementioned delay interval. That first impulse occurring after the delay interval is shown by the indicating device in its time condition relative to the reference point. In case of failure of an impulse to appear at the output line the second timing member and the indicating device are automatically switched to an output condition after 1.5 times the theoretical character duration.

6 Claims, 19 Drawing Figures

Fig. 3
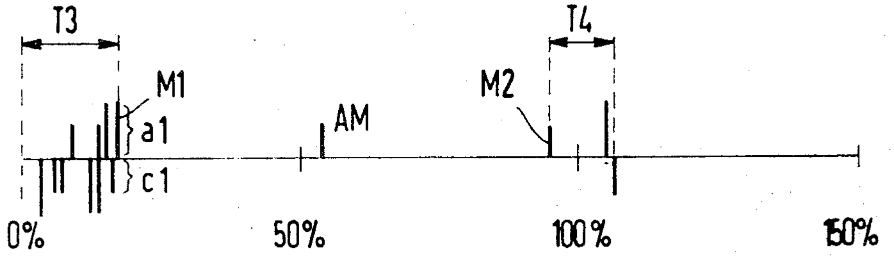
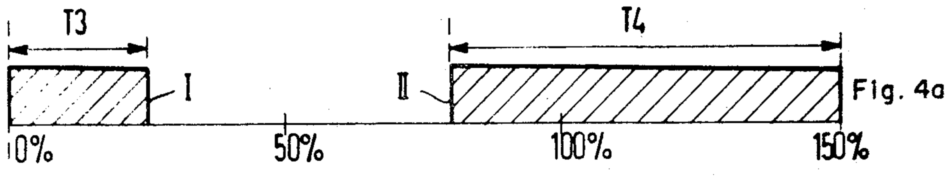
Fig. 4a
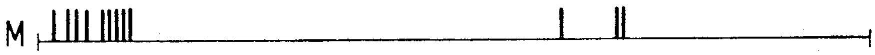
Fig. 4b

PROCESS FOR THE MEASUREMENT OF THE DISTORTION IN TRANSMISSION SYSTEMS WHICH TRANSMIT DATA IN PARALLEL BIT CODED FORM

BACKGROUND OF THE INVENTION

This invention relates to a process for the measurement of the distortion in transmission systems which transmits data in parallel bit coded form.

In teletypewriter technology, measuring processes are known, which reproduce or plot a measurement value which can be related back to a time measurement. One known measuring process evaluates the teletypewriter characters transmitted according to the start-stop principle, in that the theoretical transit time of the teletypewriter characters to be measured, together with the actual transit time, are made visible on the screen of an oscillograph. The theoretical transit times are derived from the beginning of the start step. The time displacement between the theoretical transit time and the actual transit time, related to the theoretical step length, yields the so-called "reference distortion." This "reference distortion" can assume positive as well as negative values, according to whether or not the actual transit time of the teletypewriter characters arrive too late or too early in comparison with the theoretical transit times. If they arrive too early, then one speaks of "leading reference distortion"; if in contrast, they arrive too late, then one speaks of "lagging reference distortion." Reference distortion measuring apparatus are known, which deliver a visible indication even without the utilization of an oscillograph. Glowing lamp fields serve as indicating devices, and these are staged according to the distortion values to be indicated. Numeral indicating devices may also serve as indicating devices.

The known processes for the measuring of the distortion and the corresponding measuring apparatus are only designed for series transmission. In series transmission, the individual steps of each character are successively transmitted and the distortion of the individual steps is successively transmitted and the distortion of the individual steps is successively measured and indicated. The successive steps of each character are therefore available on a single output line.

In contrast thereto, in parallel transmission the characters are transmitted coded and parallel in several frequency ranges as coded condition changes. In any given case, one or more identification conditions is transmitted in each frequency range and evaluated at the receiving end. In parallel transmission, the distortion is composed of the distortion in each frequency range and the mutual time filling of the steps in the different frequency ranges. Since only the distortion in one transmission channel can be measured with the known measuring processes, it is not conveniently possible to carry out simultaneous evaluation of parallel transmission.

It is an object of the invention to provide a means for evaluating parallel transmission systems.

SUMMARY OF THE INVENTION

To solve this problem, the first impulse edge, which arises on one of the output lines for the parallel output of the binary data, fixes the reference point for the distortion measurement and releases a first time member. After a time duration of approximately half of the theoretical character duration, the first time member gives off an impulse. The point in time, at which the impulse is given off from the first time member, is fixed as scanning mark. All of the impulse edges on the output lines, which arise during the delay time, are routed to the indicating device and indicated in their time position relative to the reference point. The first impulse edge, which arises on one of the output lines, releases a second time member, and the second time member is controlled to the output condition by the first impulse edge, which arises on one of the output lines after the delay time of the first time member. The first impulse edge after the delay time is indicated in its time position relative to the reference point by the indicating device. At the omission of an impulse edge at the output lines, the second time member and the indicating device are automatically controlled to the output condition after an interval of one-half times the theoretical character duration.

The above described measuring process makes it possible to determine a distortion value for parallel transmitted data characters, similar to the reference distortion in start-stop characters. Such measurements represent a measure of the quality of the transmission devices. The manner of operation of the measuring process is optimally suited to the manner of operation of parallel transmission systems. The measuring process directly gives a statement whether identification condition changes arise in the scanning region of the receiver and how large the time displacement thereof is. The process is suitable for an oscillograph visible indication, as well as also for a purely digital evaluation with the help of numeral indicating devices, and a limit exceeding indicator is also possible. In a simple manner, it is possible to determine from which frequency ranges the distortion values originate. The indicating device makes not only the scattering region of the identification time points optically visible, but rather also the scattering region of the character duration. If the measurement process is extinguished by a disturbance impulse, then after approximately 1.5 times the theoretical character duration, the measuring process will be broken off, and the measuring devices and indicating devices placed in the output condition.

BRIEF DESCRIPTION OF THE DRAWINGS

The principles of the invention will best be understood by reference to description given hereinbelow of an exemplary embodiment capable of performing the inventive process and to the drawings in which:

FIG. 3 shows the oscillographic visible indication, FIG. 4 constituted by FIGS. 4*a* and *b* shows the principle of the measuring process with boundary value evaluation.

DETAILED DESCRIPTION OF THE DRAWINGS

The parallel transmission takes place by means of multiple conditions, for example, frequencies. Thus, for example, in parallel character transmission two frequency groups (A and C) of four frequencies each are utilized. With the sending out of one frequency in each frequency range there occur sixteen different frequency combinations, which are associated with the individual characters to be transmitted. If three frequency regions A, B and C are used, whereby in each case four different frequencies are available in each frequency range, then with the sending out of one frequency in each frequency range there results 64 frequency combinations. That means that 64 different characters can be transmitted. The transmission of the characters can take place in two time segments. In the first time segment, for example, the frequency combination corresponding to the character is sent out, while in the second time segment, for example, a rest combination is transmitted. From the available frequency combinations one specific combination is selected and transmitted after each first frequency combination as a rest combination.

Figures 1A, 1B, 1C, 1D, 1E, 1F:
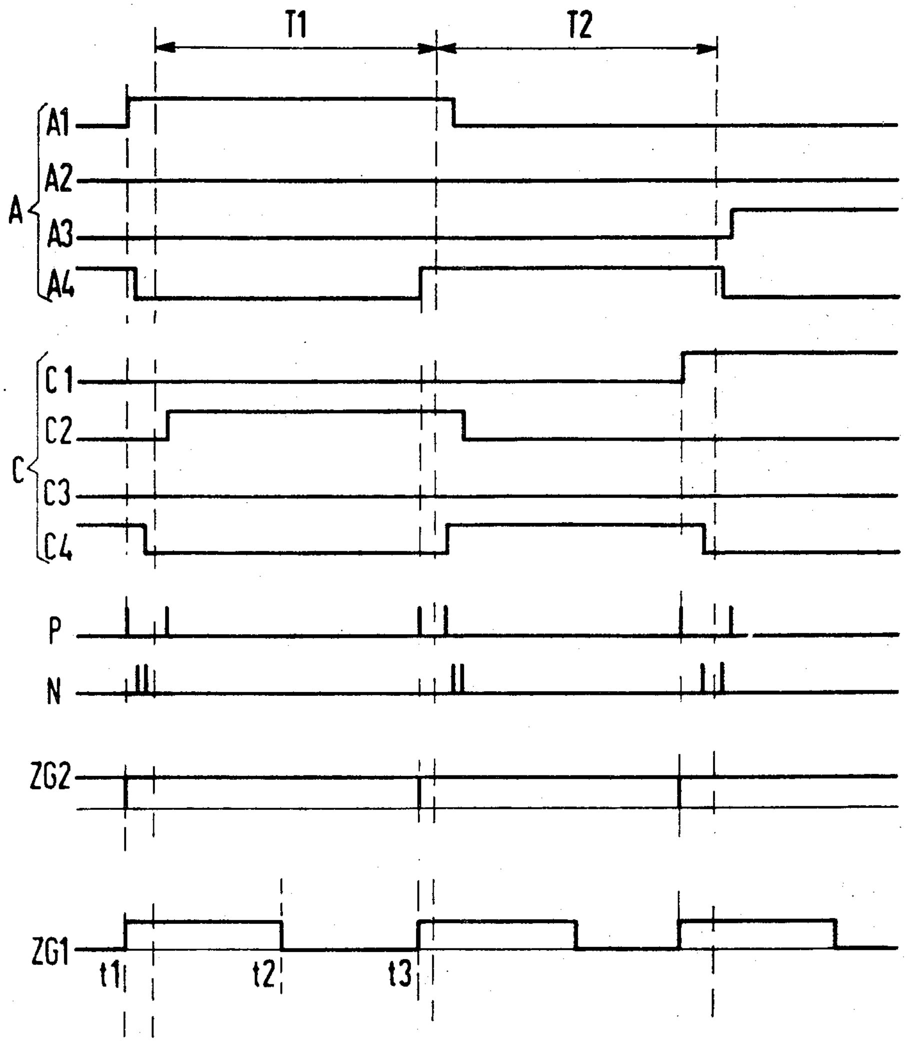
FIG. 1 constituted by FIGS. 1*a–f* is a signal-time graph illustrating the principles of the inventive process for the measurement of distortion of data characters in parallel transmission.

In FIG. 1, the output lines of the frequency range A and the signal conditions arising at the outputs are designated as A1 through A4, while C1 through C4 represent the signal conditions at the output lines of the frequency range C. The theoretical character duration is designated with T1. T2 represents the rest condition, which can be of optional duration. The output lines A1 through A4 or C1 through C4 show that a transmission system for parallel character transmission is assumed which in any given case sends out a signal condition in each frequency range. A change of the signal condition takes place in the illustrated example at the outputs A1 and A4 in frequency range A and at the outputs C2 and C4 in the frequency range C, when there is a change in the data signal.

Figure 2:
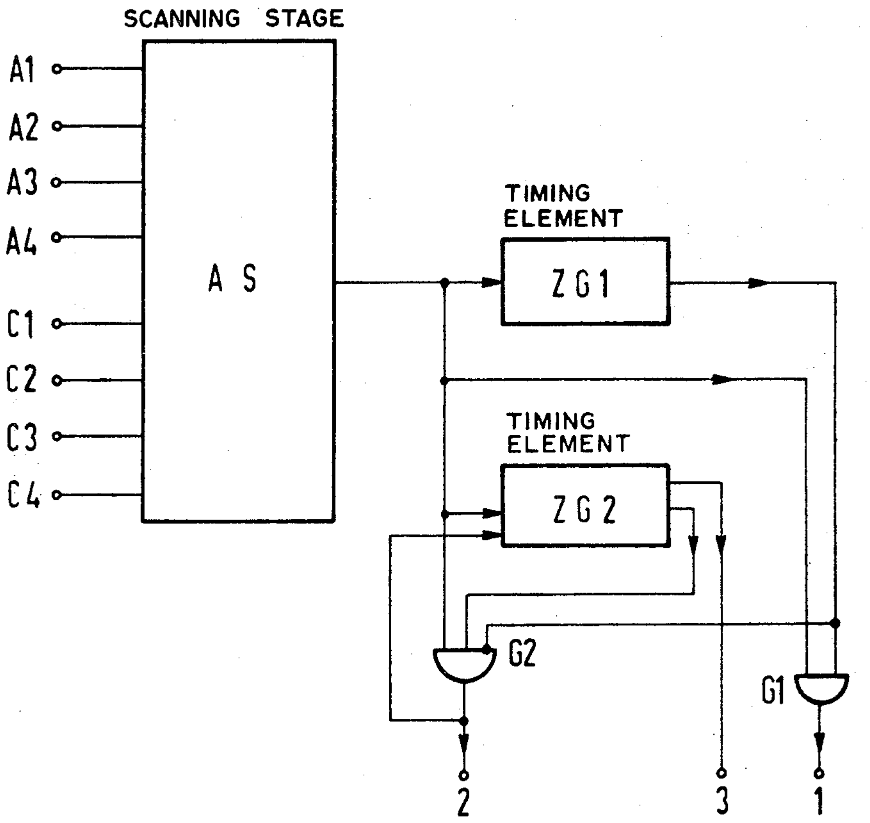
FIG. 2 shows a block circuit diagram for an exemplary embodiment capable of performing inventive process.

A block circuit diagram operative according to the time diagram in FIG. 1 is shown in FIG. 2. The outputs A1 through A4 or C1 through C4 are connected to a scanning stage AS, which separates the output signals according to positive and negative edges and associates a different identification to the impulse edges of the individual frequency ranges, so that a different indication is possible. In the lines P and N, in FIG. 1, the impulse edges are separated according to positive and negative values. These are the outputs from pulse shapers J1 and J2, respectively, which are discussed below in conjunction with FIG. 5. The first impulse edge arising at one of the outputs A1 through A4 or C1 through C4, namely, at time point *t*1 at output A1, releases the measuring process and is thus the reference point for the distortion measurement. This impulse edge starts a first time member ZG1, whose delay time corresponds approximately to half of the theoretical character duration. At the same time the first impulse edge starts a second time member ZG2, whose delay time corresponds to 1.5 times the theoretical duration. The time member ZG1 automatically triggers back to the rest position at time point *t*2, and it remains in this position until the beginning of the next character. Quite clearly, from the above described signal conditions time member ZG1 must be a monostable device, and a conventional monostable multivibrator may be used. The time *t*2 corresponds to the scanning time point of a receiving device.

The time member ZG1 opens the gate G1 during the delay time (*t*1 to *t*2), so that all of the impulse edges which arise during this time period appear over the terminal 1, for example, in the form of an oscillographic indication. After the return of the time member ZG1 to the rest condition, the time member ZG2, of the same construction as ZG1, will be returned to the output condition by the next arising impulse edge at time point *t*3. It does not, however, remain in the rest position, but rather it switches back to an operating state and the delay time begins to run anew. If no impulse edge appears after the time point *t*2, then after the 1.5 times the theoretical character duration T1 the time member ZG2 will be briefly returned to the rest condition, as above. Simultaneously therewith, the indicating device will also be directed to the rest condition. The first impulse edge after the time point *t*2, which at the same time represents the beginning of the next character, will likewise be portrayed on the screen in its time position to the reference point. Therewith, the step duration of the character is evaluated. At the return of the time member ZG2, the gate G2 gives off an impulse (*t*3) in case of coincidence with the rest position of the time member ZG1. This impulse is routed over the terminal 2 to the vertical control of the cathode ray tube of the oscillograph. The horizontal control of the cathode ray tube takes place with a sawtooth voltage waveform having a duration corresponding to the theoretical character duration, for example, 1.5 times T1.

If no impulse edge arises at one of the output lines during the 1.5 times the theoretical character duration following time point *t*2, then the time member ZG2 automatically returns to the output condition, whereby the return impulse over terminal 3 sets the indicating device in the output condition.

FIG. 3 shows the oscillographic visual indication in the distortion measurement. That is, this figure illustrates the output from terminals 1, 2 and 3 in FIG. 2. The impulse edges are designated by *a*1, which originate from the output A1 through A4; while the impulse edges which originate from frequency range C (C1 through C4) are characterized by *c*1. The impulse edges are depicted as positive or negative impulses corresponding to their appearance. The measuring region extends to 150 percent of a theoretical character duration, and the screen picture shows in the beginning region the scattering width of occurrence of pulses appearing at the input, T3. In the middle the scanning marking AM and in the end region the scattering width T4 of the character duration are shown. In a digital numerical indicator, the maximum value of the scattering width of the identification time points M1 and the minimal value M2 of the scattering widths of the character duration are shown.

One especially simple and digitally interpretable indication possibility is a limit value exceeding evaluation, which is represented in principle in FIG. 4. Again, FIG. 4 represents a possible oscillographic display of the outputs from the FIG. 2 circuit. The allowable scattering region of the measured signal time points is fixed and the maximum allowable deviation is set as boundary value I. Likewise, the allowable scattering region of the character duration is determined, and the minimum allowable character duration is set as boundary value II. The measuring impulses M which fall in the scattering region identified by cross-hatching, release no indication. An indication results only when an impulse edge exceeds the boundary value I or the character duration exceeds the boundary value II. In the simplest case the indication can take place with a pair of lamps having the legent "Good" or "Bad" imprinted thereon.

Figure 5:
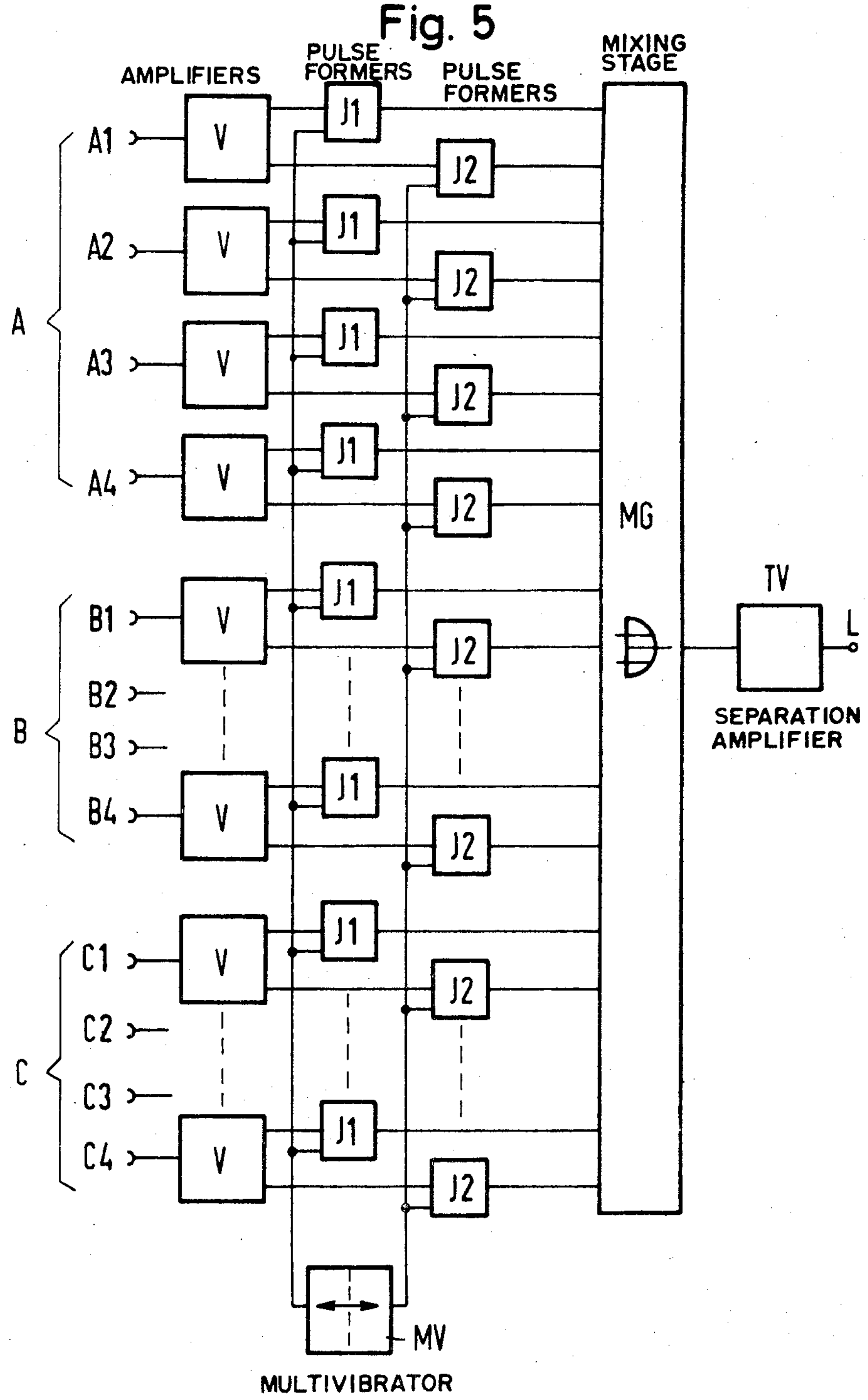
FIG. 5 shows a block circuit diagram illustrative of the scanning stage for the formation of the indicating impulse, and FIG. 6 constituted by FIGS. 6*a–h* shows the representation of the identification time points of the individual frequency ranges with the help of impulse amplitude grading through the scanning stage.
Figure 6A:
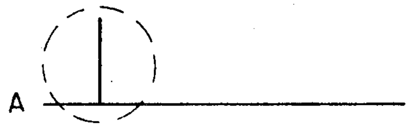
Figure 6E:
Figure 6B:
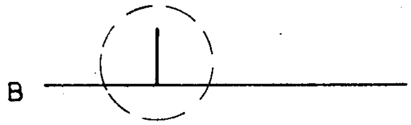
Figure 6F:
Figure 6C:
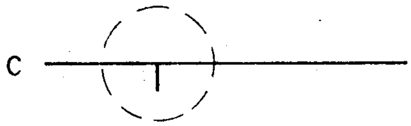
Figure 6G:
Figure 6D:
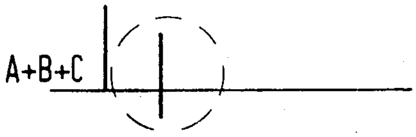
Figure 6H:
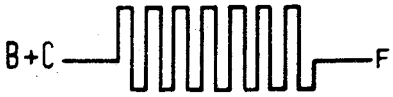

FIG. 5 shows in a block circuit diagram the scanning stage AS, which makes possible a special type of representation on the screen of the oscillograph. Thus, not only is the recognition of the transit time points and the direction of the impulse edges achieved for each channel, but also a different portrayal of the three frequency regions is achieved. The three frequency ranges include the outputs A1 through A4, B1 through B4, and C1 through C4. The parallel character transmission takes place so that in each frequency region signal condition change is transmitted. The output lines give off their signal conditions to the input amplifiers V. Two impulse formers or generators J1 and J2 are connected at the output of each input amplifier. The two parallel connected impulse formers of each output line are constructed in complementary fashion. The one stage derives a positive impulse from the rising edge of the output signal; the other derives a negative impulse from the falling edge. Through the polarity of the measuring impulses the transit direction of the identifying condition changes can thus be represented.

So that the measuring impulses of the three frequency ranges A, B and C are differently depicted on the screen of the oscillograph according to frequency group, the amplitude of the measuring impulses is adjusted differently. The measuring impulses of the frequency region A receive the full amplitude, those of group B receive approximately two-thirds of the amplitude and the group C receives one-third of the amplitude. The measuring impulses of all of the output lines are brought together over a mixing stage MG, separated according to polarity. If one now portrayed this signal altogether, then two oppositely poled, equally large impulses, which arise simultaneously, when impulse edges of different polarity simultaneously arise at two output lines in one group, could then cancel. In order to avoid this, the voltage lead of the impulse former is periodically keyed (or modulated) through an astable multi-vibrator MV with high frequency. The two measuring impulses now do not cancel each other, but rather they appear as an impulse group from the length of the measuring impulse (compare FIG. 6). The measuring impulses are amplified separately according to the polarity and then passed together over the separation amplifier TV to the output terminal L.

All 12 amplifiers V and the 24 impulse formers (J1, J2) are, respectively, constructed in the same manner and are of conventional construction. They differ only in the dimensioning of the output resistances which fix the amplitude of the indicating impulses, and these differences are according to frequency region (A, B, C). Each impulse former comprises a switching transistor, which is controlled through transformer coupling by a multivibrator MV, of known construction for switching pulses received from amplifiers V. Positive operating voltage to all 12 pulse generators J1, which generate the positive indicating impulses and negative operating voltage to the other 12 pulse generators J2, which generate the negative indicating impulses are alternately applied by multivibrator MV. The multivibrator MV possesses a start arrangement, which guarantees a reliable start. The indicating impulses reach the vertical control of a cathode ray tube, whose horizontal control is influenced by a sawtooth-formed voltage with the character duration of 1.5 times the theoretical character duration.

FIG. 6 shows on the left side in FIGS. *6a–d* the positive and negative indicating impulses given off by the impulse formers J2 in the selected different stepping of the impulse amplitudes, respectively, for the frequency regions A, B and C. The last line (FIG. *6d*) shows the oscillographic screened picture, by which the three indicating impulses of the three frequency regions (A + B + C) are portrayed together. The right side of FIG. 6, i.e., FIGS. *6e–h*, shows a positive indicating impulse of the frequency regions B and C and a negative indicating impulse of the frequency region A expanded in time. It can be seen therefrom that the impulse is changed by the multivibrator with high frequency. The last line (B + C) shows a screen picture with changes of the identifying conditions in the frequency ranges B and C. The oscillographic screen picture allows it to be recognized that a positive indicating impulse is present in the frequency region B and a negative indicating impulse is present in the frequency region C.

The indication allows an exact determination of the distortion, especially from which output lines it originates and to what extent the total distortion is influenced thereby.

The foregoing description of an exemplary embodiment constructed to operate according to the inventive process is not to be considered as limiting. The scope of the invention is defined by the appended claims within which it is contemplated that many modifications and changes to the exemplary embodiment may be made.

We claim:

1. Process for measurement of distortion in transmission systems which transmit binary coded data in parallel form on parallel output lines from a data source, comprising the steps of:

setting a reference point at and actuating a first timing member at the first appearance of an impulse on one of the parallel output lines, producing an output from said first timing member during an interval corresponding to 0.5 times the theoretical character duration, an edge of said first timing member output being used as a scanning mark, routing all impulses appearing on the output lines during said interval to an indicating device and there indicating their time relation to said referenced point, actuating a second timing member upon the first appearance of an impulse on one of the output lines, producing an output from second timing member upon the first appearance of an impulse on one of the output lines after said interval has elapsed, indicating the time position of said first impulse following said interval relative to said reference point and switching said second timing member and said indicating device to an output condition after 1.5 times the theoretical duration of a character on the failure of an impulse to appear on an output line.

2. The process defined in claim 1 comprising the additional step of:

producing a scanning pulse on a separate output line for switching said first timing member to a quiescent state.

3. The process defined in claim 2 wherein only the maximum value of the scattering width of identifying time points and the maximum value of the scattering width of the character duration is indicated.

4. The process defined in claim 3 comprising the additional steps of:

selecting the predetermined scattering region for identifying time points and a predetermined scattering region for character duration and producing an indication when said scattering region for identifying time points is exceeded and when the scattering region for character duration is not reached.

5. The process defined in claim 1 comprising the additional step of:

producing impulses in each group of a predetermined number of groups of frequencies, each impulse corresponding to a given group being of a different amplitude relative to the impulse for other groups.

6. The process defined in claim 5 wherein said impulses are produced by high frequency switching of an operating voltage.

* * * * *